Patented Oct. 21, 1952

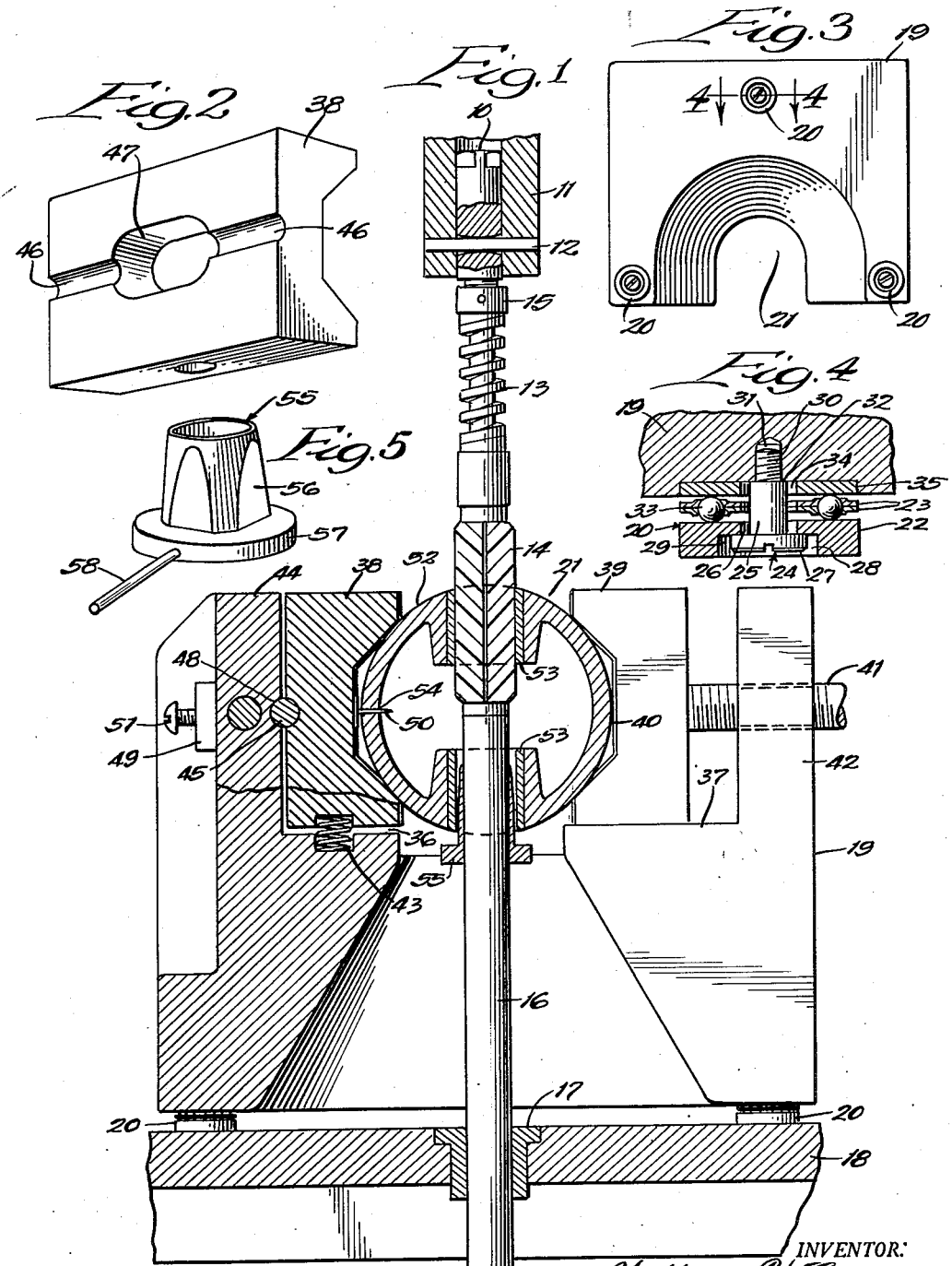

2,614,443

UNITED STATES PATENT OFFICE 2,614,443

JIG FOR LINE REAMING AND BORING MACHINES

William H. Evans, Miami Beach, Fla.

Application December 13, 1950, Serial No. 200,555

6 Claims. (Cl. 77—63)

My invention relates to a jig for use in connection with line reaming and boring machines. More particularly my invention relates to a jig for holding the work in line reaming and boring machines which employ a relatively long vertically suspended reamer. My invention has particular utility in connection with the overhauling of internal combustion engines when it is desired to ream the bearings in the piston in which the wrist-pin is supported as well as the upper connecting rod bearing which engages the central portion of the wrist-pin.

The present case is a continuation-in-part of my co-pending application, Serial No. 141,809, filed February 1, 1950, for Line Reaming and Boring Machine, now Patent No. 2,548,005, issued January 29, 1952.

Various line reaming and boring machines wherein a long reamer is vertically suspended are in common use for machining operations such as the reboring of piston bearings. One such machine is shown in my co-pending application cited above. In such machines the reamer is suspended above a bed or table on which the work is held. For supporting the part to be bored or reamed, a jig or work holder is usually provided. Until the present invention it has been the universal practice to clamp or otherwise rigidly secure the jig to the table after centering the part to be bored.

A problem has arisen in connection with machines of this type, since when relatively long reamers are used, they frequently have a tendency to cut or ream the hole larger than desired. This oversize cutting is primarily caused by a variation in the trueness of the reamer. Long reamers tend to run out from five to ten-thousandths of an inch in the center in spite of all precautions in manufacturing them. This deviation produces a whip while the reamer is engaged with the work and thereby causes the hole to be larger than desired. This problem is especially acute in connection with the reaming of the bearings in automobile pistons, since the two bearings supporting the wrist-pins must be precisely aligned, and of the correct size.

Another problem is presented in providing a means for locking the work on the jig in an aligned position with the reamer. When jigs are used having clamping blocks which can be notched, and at least one of which is movable, it has been found that the clamping of these blocks about the work tends to slightly twist or turn the work out of proper alignment. As pointed out above, the maintenance of an exactly true alignment while reaming is especially important in reconditioning the bearings of automobile cylinders.

It is therefore an object of my invention to devise a jig or work holder which will allow the part being machined to adjust itself to any whip in the reamer produced by a variation in the trueness of the reamer. It is another object of my invention to provide a work holder which will prevent a long reamer from cutting oversize because of slight amplitude or lateral movements by following the reamer in said amplitude or lateral movements. It is another object of my invention to provide a jig which will have a substantial floating action in relation to the bed of a line reaming and boring machine, which will permit a limited rotary movement of the holder with respect to the bed. It is also an object of my invention to modify the clamping jaws or blocks used in work holders so that the jaws can be clamped about the work without tending to twist or turn it out of true alignment for the reaming operation. Further objects and advantages will appear as the specification proceeds.

In one phase of my invention, I have discovered that some of the above objects can be substantially accomplished by supporting a jig adapted to hold the work in a line reaming and boring machine on a plurality of thrust bearings to permit lateral movement of the jig. In another phase of my invention, I have discovered that additional objects can be accomplished by utilizing a rod-hinge for supporting at least one of the clamping blocks in a jig; and I have further found that it is desirable to additionally support the hinged block by means of a spring.

My invention is illustrated in a preferred embodiment in the accompanying drawing in which—

Figure 1 is an enlarged vertical view of my work holder showing a portion of the work holder and supporting table in section; Fig. 2, a perspective view of my hinged clamping block; Fig. 3, a bottom view of my jig showing the location of the pedestals which are adapted to permit a limited floating movement of the jig; Fig. 4, an enlarged vertical sectional view of one of the pedestals of Fig. 3 showing the thrust bearings within the pedestal for supporting the jig; and Fig. 5, a bushing which can be used to center the reamer within the hole desired to be reamed.

Turning now to the illustrated embodiment with particular reference to Fig. 1, 10 designates a reamer shaft of a relatively long reamer such as is shown in my co-pending application, Serial No. 141,809, filed February 1, 1950 for Line Reaming and Boring Machine. Although it is not shown, it will be understood that shaft 10 is vertically suspended so that it can be rotated and raised and lowered. It will be also understood that shaft 10 will be equipped with suitable means for rotating it and for raising and lowering it.

As shown in Fig. 1, shaft 10 is secured to a rack sleeve 11 by means of pin 12 so as to permit rotation of shaft 10 while rack 11 remains stationary. It will generally be desired to provide the edges of rack 11 with teeth engaging a pinion for raising and lowering shaft 10.

Below rack 11 reamer shaft 10 is equipped with a compression spring 13 backing reamer 14. An adjustment nut 15 is also provided above compression spring 13. Below reamer 14 there is provided a smooth extension 16, which is designed to rotate within a bearing or collar 17 located in table or bed 18. It will be understood that bed 18 is horizontally supported below reamer shaft 10. Since all of these details of construction are well known it is not believed that it will be necessary to further describe them herein. Specifically, they are all shown and described in my co-pending application previously cited.

Jig or work holder 19 is supported on bed 18 by means of a plurality of pedestals 20. In the illustration given, jig 19 is formed of a unitary block having a U-shaped opening 21 therethrough. It will be apparent, however, that jig 19 need not be integrally formed, but rather can be composed of several parts.

Looking at Fig. 4, it can be seen that pedestals 20 are composed of several parts. In accordance with my invention, jig 19 can be supported on thrust bearings in any suitable way so as to permit limited radial movement. In the illustration given, pedestals 20 are formed from support disks 22, rings 23 and screw 24. It will be understood that support disk 22 need not be round, but may be given any other geometrical configuration so long as it is adapted to rest on bed 18 and thereby hold jig 19 in an upright position. Support disk 22 is apertured to receive the shank 25 of screw 24. This aperture designated as 26, is made considerably larger than shank 25 to permit radial movement of screw 24 within aperture 26. Also, aperture 26 is counter-sunk to receive the head 27 of screw 24. This counter-sunk recess 28 is adapted to provide shoulders 29 to engage the lower surface of head 27 and to permit relative motion between these surfaces. In this connection it will be noted that recess 28 is made substantially larger than head 27 to permit radial movement of head 27 within recess 28.

Screw 24 is provided with a threaded end 30 which is received within a threaded aperture 31 in the base of jig 19. In the illustration given shank 25 is enlarged above threaded end 30 to provide shoulders 32 for adjusting the set of screw 24. Between the bottom of jig 19 and support disk 22 is provided rings 23. Rings 23 have a plurality of ball bearings 33 rotatably secured therein. Balls 33 extend beyond the surfaces of ring 23 and thus provide for the thrust of jig 19 to be transmitted to disk 22 only through balls 33. Rings 23 have a central aperture 34 corresponding in size to aperture 26 in disk 22. Aperture 34 is preferably considerably larger in diameter than the diameter of shank 25 so as to permit movement of rings 23 in a horizontal plane.

In addition to the structure described, I prefer to provide a washer 35 having an aperture therein to receive shank 25 of screw 24. Washer 35 is preferably secured within a recess in the bottom of jig 19. The under-surface of washer 35 thus provides a bearing surface for balls 33 and prevents wearing of the under-surface of jig 19. I also prefer to locate shoulders 32 of screw 24 at such a distance from the under-side of head 27 that shoulders 19 of disk 22 will be somewhat loosely engaged. This facilitates the setting of screw 24 to permit the radial movement of disk 22 with respect to screw 24.

It will be apparent that any number of pedestals 20 or other thrust bearing supporting legs can be used on the under-surface of a jig or work holder such as jig 19. As shown in Fig. 3, however, I have found that three pedestals provide sufficient support for jig 19. It will be apparent, however, that a larger number of support pedestals can be used, for example, four pedestals, one being located in each corner.

At the top of jig 19 the opening 21 therethrough is enlarged to provide shelves 36 and 37. On shelves 36 and 37 are mounted clamping blocks 38 and 39. Clamping blocks 38 and 39 preferably have a V-shaped or notched front surface to assist in gripping the part to be reamed. It will be apparent, however, that the front faces of blocks 38 and 39 can be modified in various ways to assist in clamping the work. In the illustration given, one end of blocks 38 and 39 is equipped with shims 40 to assist in clamping a part such as an automobile piston which is slightly tapered.

Clamping block 39 is slidably mounted on shelf 35. Rod 41 is provided for actuating block 39. If desired, a threaded portion of rod 41 can be made to engage a threaded aperture in wall 42 of jig 19, and various turning adaptations can be placed on the end of rod 41. It will be noted that shelf 37 is cut sufficiently deep to allow for the sliding of clamping block 39.

Clamping block 38 is supported on shoulder 36 by means of a compression spring 43. A recess is provided in shelf 36 and in the bottom of notched block 38 to receive spring 43 so that block 38 will be held normally at a distance of about one-sixteenth to one-eighth of an inch above shelf 36. The rear face of block 38 is hinged to wall 44 of jig 19 by means of rods 45. Rods 45 engage grooves 46 in block 38. Grooves 46 are horizontally aligned and located on each side of oval-shaped aperture 47. The purpose of aperture 47 will subsequently be described, but it will be apparent that if aperture 47 is not desired, that grooves 46 can be made continuous and a continuous rod 45 used to engage them. Grooved or semi-circular recesses 48 are provided in the surface of wall 44 to receive rod 45. If desired, rod 45 can be rotatably received within grooves 48. However, in order to obtain the desired hinging action it is only necessary that block 38 be permitted to turn about rod 45. It will be noted that semi-circular recesses 46 and 48 are cut so that block 38 will be held away from wall 44 by rod 45. I have found that it is desirable to have this clearance about one-sixteenth to one-eighth inch.

Aperture 47 is designed to receive a plunger 49 adapted to urge a wedge tip 50 inwardly beyond the innerface of wedged block 38. Headed screw 51 is provided to check the inward movement of wedge 50 when it is not engaged by a part clamped between blocks 38 and 39. This wedge-equipped plunger 49 is especially useful in connection with the reaming of piston bearings in pistons which have a slot in the skirt thereof. By introducing a wedge 50 into the slot in the skirt of said pistons, blocks 38 and 39 can be tightly clamped about the piston without damaging its circular configuration. The operation and detail of plunger 49 are more fully disclosed in my co-pending application U. S. Serial No. 141,809, filed February 1, 1950, for Line Reaming and Boring Machine.

In the illustration given in Fig. 1 a typical automobile piston 52 having wrist-pin bearings 53 and skirt slot 54 is shown clamped between blocks 38 and 39. Wedge 50 is engaging slot 54 and reamer shaft 10 is aligned piston bearings 53.

To assist in centering jig 19 around reamer shaft 10, I prefer to use a bushing 55, which is inserted within one of the bearings to be reamed as shown in Fig. 1. Bushing 55 is thimble-shaped being tapered upwardly and provides oppositely-disposed flattened surfaces 56. Bushing 55 also has a disk portion 57 at the base thereof, and guide pin 58 extending laterally from disk 57.

Operation

For illustrative purposes, the operation of my jig, as shown in Fig. 1, will be described in connection with the reaming of the wrist-pin bearings in an automobile piston. It will be understood, however, that my jig or certain features thereof can be utilized in connection with the reaming and boring of various other types of work pieces.

In the reaming of a piston, such as piston 52 which has a slot 54 in the skirt thereof and wrist-pin bearings 53, the operator places the piston against block 38 and with the slot 54 thereof in a position so as to be engaged by wedge 50. Block 39 is then brought toward piston 52 by means of actuating rod 41 until piston 52 is loosely clamped within the notched jaws of blocks 38 and 39. Reamer shaft 10 is then lowered to a point just above piston 52, and jig 19 is slid on bed 18 until it is centered under reamer shaft 10. The smooth extension 16 of reamer shaft 10 is then extended through bearings 53 until the bottom tip thereof passes into bearings 17 in bed 18. At this point, reamer 14 will be just above the uppermost of bearings 53. Centering bushing 55, having been previously secured around smooth extension 16, is then elevated to engage the lowermost of bearings 53. In the illustration given bushing 55 can be readily raised and correctly aligned by means of guide pin 58. Upon establishing the correct alignment of reamer shaft 10, piston 52 is securely clamped by moving block 39 toward block 38 by means of actuating rod 41.

It will be apparent in this final clamping operation that if piston 52 does not perfectly engage the notched portions of blocks 38 and 39 the clamping blocks will have a tendency to twist. In the structure provided, this twisting tendency is provided for by allowing block 38 to pivot slightly about rod 45. Thus, the piston can be securely clamped within jaws 38 and 39 without altering the established alignment of piston 52 beneath reamer shaft 10. When piston 52 is securely clamped, block 38 will also be effectively clamped and prevented from moving during the reaming operation.

After piston 52 is thus centered and clamped within blocks 38 and 39 reamer shaft 10 is then caused to rotate, and reamer 14 is lowered to engage the surfaces of the uppermost of the bearings 53. If desired, a liquid such as an oil can be applied to the surfaces being reamed.

In the use of a long reamer, as pointed out above, it is almost impossible to get the reamer running perfectly true. In spite of the most careful attention in establishing such trueness the reamer can be expected to run out five to ten-thousandths of an inch in the center, causing a whip. This causes the reamer to cut oversize when the jig is held rigidly or restrained by a substantial amount of friction to the bed on which it is supported. With my jig, however, this does not happen. Since jig 19 is supported on pedestals 20 which have incorporated therein thrust bearings to receive the weight of jig 19, jig 19 is permitted to follow slight radial or amplitude movements of reamer 14 during the reaming operation. From an inspection of Fig. 4 it will be apparent that it is desirable to center rings 23 and disk 22 about screw 24 before beginning the reaming operation. This will enable jig 19 to execute circular movements of varying diameters, and thus allow the work piece to follow reamer 14.

I have found that it is desirable in using my jig, which gives a substantial floating action to ream piston bearings to hold bushing 55 within the lowermost bearing while the reaming operation is in progress. This is advantageous in assisting jig 19 to follow reamer 14.

While in the foregoing specification I have described my jig in great detail for purpose of illustration, it will be readily apparent to those skilled in the art that many of the specified details can be widely varied without departing from the spirit of my invention.

I claim:

1. An improved jig adapted to increase the accuracy of the cut in reaming and boring machines which employ a long vertically suspended reamer, comprising a work holder having a vertical opening therethrough to receive said reamer, means for clamping the work piece in said work holder in alignment with said opening, and three pedestals for supporting said jig on a horizontal bed fastened to the bottom surface of said work holder in spaced-apart relation by means permitting limited movement of said pedestals in all directions parallel to said bottom surface, said pedestals including thrust bearings for supporting the weight of said jig and facilitating the radial movement thereof, whereby said jig can follow the amplitude movements of said reamer as it reams the work piece therein without tipping with respect to the surface supporting said pedestals.

2. An improved jig adapted to increase the accuracy of the cut in reaming and boring machines which employ a long vertically suspended reamer, comprising a generally rectangular work holder having a vertical opening therethrough to receive said reamer, means for clamping a work piece in said work holder in alignment with said opening, and three support pedestals fastened to the bottom surface of said work holder in spaced-apart relation around the periphery thereof, said pedestals receiving the thrust of said jig through ball bearings rotatably suspended within a ring and said rings being adapted to permit radial movement of said jig with respect thereto whereby said jig can follow the amplitude movements of said reamer as it reams the work piece therein without tipping with respect to the surface of said pedestal.

3. The improvement in jigs for holding the work piece in line reaming and boring machines, which comprises a work holding member having a vertical opening therethrough, clamping members mounted on each side of said opening, one of said clamping members being movable towards the other of said members for clamping a work piece in said jig in alignment with said opening, at least one of said clamping members being horizontally hinged by a rod engaging grooves in the abutting faces of said work holding member and said clamping member, and at least one spring member adapted to normally urge said hinged clamping member upwardly to maintain clearance between the adjacent surfaces of said hinged clamping member and said work holder member.

4. The improvement in jigs for holding a work piece in reaming and boring machines, comprising a generally rectangular work holder having a vertical opening therethrough adapted to receive a reamer shaft, notched clamping blocks supported by said work holder on each side of said opening, one of said notched blocks being movable towards the other of said blocks for clamping a work piece in said jig in alignment with said opening, the other one of said clamping blocks being horizontally hinged to said work holder by means of a rod engaging grooves in the abutting faces of said block and said work holder, and a compression spring located between the abutting vertical surfaces of said work holder and said hinged block to maintain a clearance therebetween.

5. An improved jig adapted to facilitate clamping of the work piece and to increase the accuracy of the cut in reaming and boring machines which employ a long vertically suspended reamer or the like, comprising a work holder having a vertical opening therethrough adapted to receive said reamer, clamping members supported by said work holder on each side of said opening, one of said members being movable toward the other of said members for clamping a work piece in said jig in alignment with said opening, at least one of said clamping members being hinged horizontally to said work holder by means of a rod engaging grooves in the abutting faces of said work holder and said clamping member thereby permitting a slight rotation of said hinged clamping member while clamping a work piece, a plurality of thrust bearing-equipped pedestals secured to the underside of said work holder for supporting said work holder on a horizontal surface, said pedestals being adapted to permit a limited radial movement of said work holder so that said work holder can follow amplitude or lateral movements of said reamer.

6. In combination with a reaming and boring machine including a vertically suspended reamer having a long shaft and a horizontal bed beneath said reamer for supporting the work piece, a work holding means having its bottom equipped with three spaced pedestals resting on said bed, and thrust bearings within said pedestals supporting the weight of said jig and permitting limited substantially frictional-less movement of said jig in all directions with respect to said bed, whereby the tendency of said reamer to cut oversize when not reaming perfectly true is substantially overcome since said jig is permitted to follow the amplitude movements of said reamer as it reams the work piece therein without tipping on said bed.

WILLIAMS H. EVANS.

REFERENCES CITED

The following references are of record in the file of this patent:

UNITED STATES PATENTS

| Number | Name | Date |
| --- | --- | --- |
| 111,084 | Reaney | Jan. 17, 1871 |
| 820,965 | Froggatt | May 22, 1906 |
| 2,071,959 | Wayman | Feb. 23, 1937 |
| 2,266,928 | Walker | Dec. 23, 1941 |
| 2,350,099 | Dermond | May 30, 1944 |
| 2,451,683 | Mantle | Oct. 19, 1948 |